United States Patent
Shanahan et al.

(10) Patent No.: US 7,020,753 B2
(45) Date of Patent: Mar. 28, 2006

(54) INTER-DOMAIN DATA TRANSFER

(75) Inventors: Patricia Shanahan, San Diego, CA (US); Andrew E. Phelps, Encinitas, CA (US); Guy David Frick, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/042,960

(22) Filed: Jan. 9, 2002

(65) Prior Publication Data

US 2003/0131213 A1 Jul. 10, 2003

(51) Int. Cl.
*G06F 12/00* (2006.01)

(52) U.S. Cl. .................. 711/147; 711/203; 709/212; 709/215; 707/10

(58) Field of Classification Search .............. 707/10; 711/202–203, 147–148, 124; 709/212–216, 709/234, 237, 250; 710/3, 52
See application file for complete search history.

(56) References Cited

U.S. PATENT DOCUMENTS

| | | | | |
|---|---|---|---|---|
| 4,315,310 A | * | 2/1982 | Bayliss et al. | 710/3 |
| 4,564,900 A | * | 1/1986 | Smitt | 709/212 |
| 4,956,771 A | * | 9/1990 | Neustaedter | 710/52 |
| 5,253,342 A | | 10/1993 | Blount et al. | 711/202 |
| 5,297,265 A | | 3/1994 | Frank et al. | 709/232 |
| 5,299,313 A | * | 3/1994 | Petersen et al. | 709/234 |
| 5,592,625 A | * | 1/1997 | Sandberg | 711/147 |
| 5,613,068 A | * | 3/1997 | Gregg et al. | 709/216 |
| 5,710,910 A | * | 1/1998 | Kehl et al. | 713/400 |
| 5,721,828 A | | 2/1998 | Frisch | 709/217 |
| 5,841,988 A | * | 11/1998 | Chennubhotla et al. | 709/237 |
| 5,867,656 A | * | 2/1999 | Iwasaki et al. | 709/215 |
| 5,918,229 A | | 6/1999 | Davis et al. | 707/10 |
| 6,049,853 A | * | 4/2000 | Kingsbury et al. | 711/147 |
| 6,075,938 A | * | 6/2000 | Bugnion et al. | 703/27 |
| 6,078,733 A | * | 6/2000 | Osborne | 709/250 |
| 6,108,694 A | * | 8/2000 | Yashiro et al. | 709/216 |
| 6,295,585 B1 | * | 9/2001 | Gillett et al. | 711/148 |
| 6,332,180 B1 | | 12/2001 | Kauffman et al. | 711/153 |
| 6,516,343 B1 | * | 2/2003 | Pong et al. | 709/216 |

FOREIGN PATENT DOCUMENTS

| EP | 0899659 A | 3/1999 |
|---|---|---|
| WO | 01/11468 A1 | 2/2001 |

* cited by examiner

*Primary Examiner*—Nasser Moazzami
(74) *Attorney, Agent, or Firm*—Meyertons Hood Kivlin Kowert & Goetzel, P.C.; B. Noël Kivlin

(57) ABSTRACT

The present invention provides a method and apparatus for inter-domain data transfer. The method includes mapping a memory region of a source device into a central device and mapping a memory region of a target device into the central device. The method further includes transferring data from the mapped memory region of the source device to the mapped memory region of the target device.

24 Claims, 9 Drawing Sheets

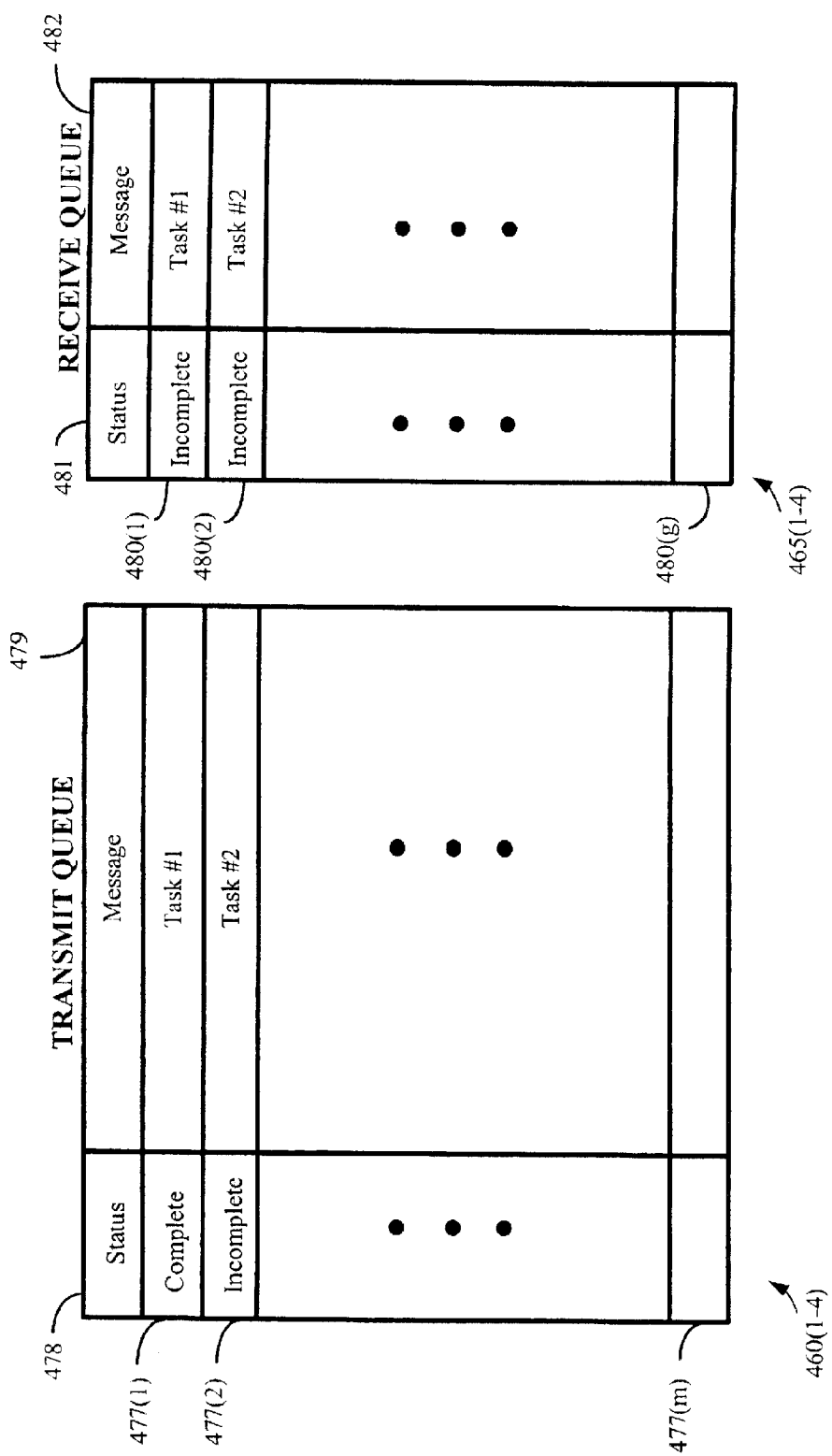

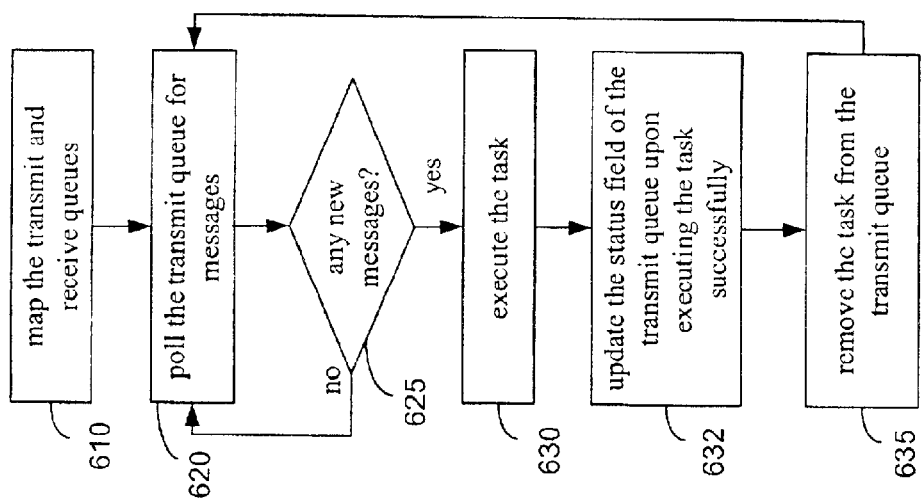

INTER-DOMAIN DATA TRANSFER

BACKGROUND OF THE INVENTION

1. Field of the Invention

This invention relates generally to data transfer, and, more particularly, to inter-domain data transfer.

2. Description of the Related Art

Businesses typically rely on network computing to maintain a competitive advantage over other businesses. As such, developers, when designing processor-based systems for use in network-centric environments, may take several factors into consideration to meet the expectation of the customers, factors such as functionality, reliability, scalability, and performance of such systems.

One example of a processor-based system used in a network-centric environment is a mid-range server system. A single mid-range server system may have a plurality of system boards that may, for example, be configured as one or more domains, where a domain, for example, may act as a separate machine by running its own instance of an operating system to perform one or more of the configured tasks.

The benefits of providing substantially independently operating domains within an integrated system become readily apparent as customers are able to perform a variety of tasks that would otherwise be reserved for several different machines. However, in some instances, it may be desirable to link one or more substantially independent domains, for example, to take advantage of common hardware resources. Additionally, it may be desirable to efficiently transfer data between domains while maintaining error isolation between the linked domains.

SUMMARY OF THE INVENTION

In one embodiment of the present invention, a method is provided for data transfer. The method includes mapping a memory region of a source device into a central device and mapping a memory region of a target device into the central device. The method further includes transferring data from the mapped memory region of the source device to the mapped memory region of the target device.

In another embodiment of the present invention, an apparatus is provided for inter-domain data transfer. The apparatus includes an interface and a controller that is communicatively coupled to the interface. The controller is adapted to receive a task to transfer data from a first client domain to a second client domain and to map a memory region of the first client domain into a central domain. The controller is further adapted to map a memory region of a second client domain into the central domain, and transfer the data from the mapped memory region of the first client domain to the mapped memory region of the second client domain.

In yet another aspect of the instant invention, an article comprising one or more machine-readable storage media containing instructions is provided for inter-domain data transfer. The instructions, when executed, may enable a processor to access a transmit queue and determine that a message is stored in the transmit queue for execution, wherein the message comprises a source address and destination address. The instructions, when executed, may further enable the processor to map a memory region corresponding to the source address in a shared resource domain, map a memory region corresponding to the destination address in the shared resource domain, and transfer data between the mapped memory region of the source address and the destination address.

BRIEF DESCRIPTION OF THE DRAWINGS

The invention may be understood by reference to the following description taken in conjunction with the accompanying drawings, in which like reference numerals identify like elements, and in which:

FIGS. 4B–C depict exemplary queues that may be employed in a client domain of the domain set configuration of FIG. 4A, in accordance with one embodiment of the present invention;

FIG. 6 illustrates a flow diagram of a method for allowing inter-domain communications, in accordance with one embodiment of the present invention;

Figure 1:
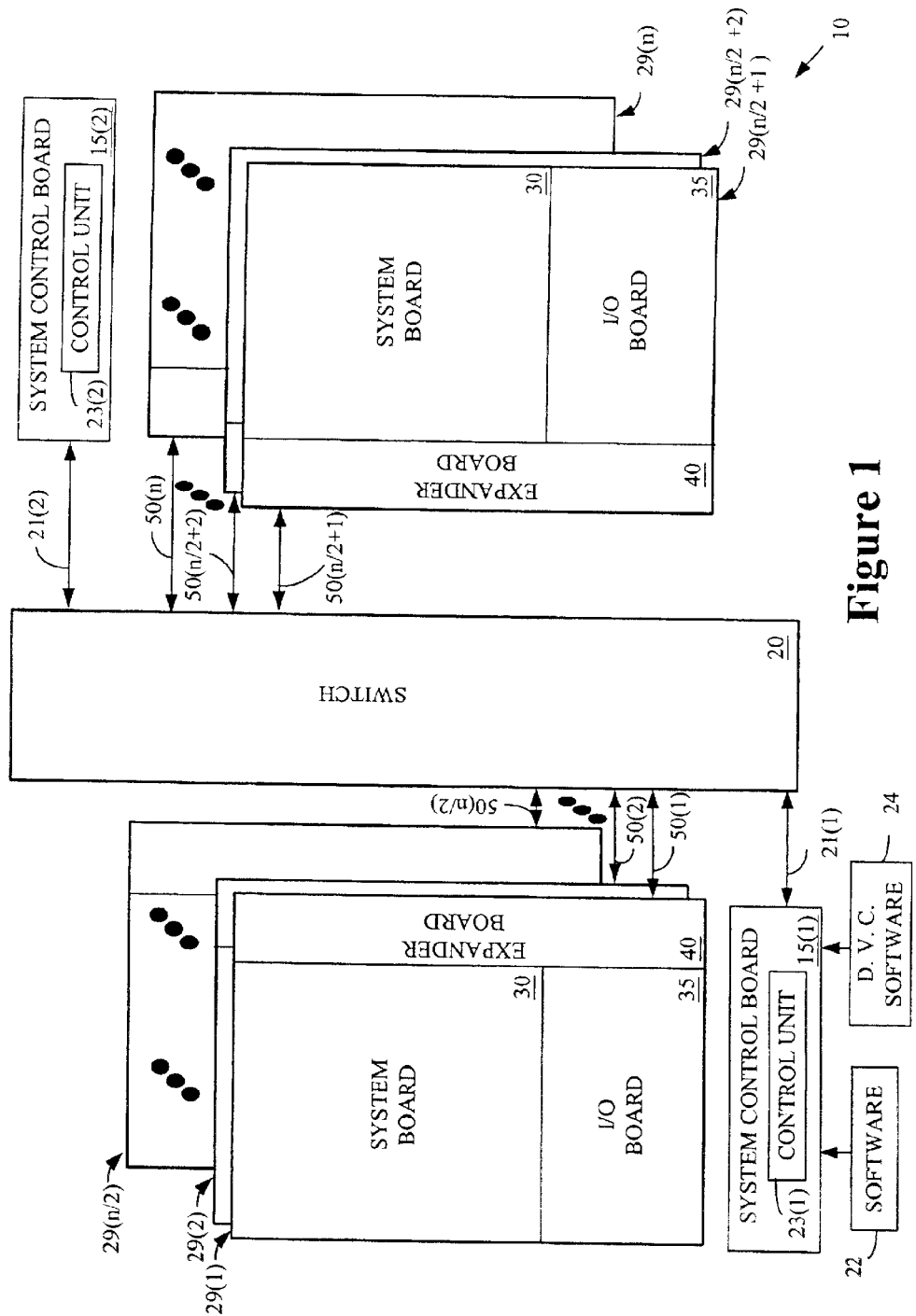
FIG. 1 shows a stylized block diagram of a system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, a block diagram of a system 10 in accordance with one embodiment of the present invention is illustrated. The system 10, in one embodiment, includes a plurality of system control boards 15(1-2) that are coupled to a switch 20. For illustrative purposes, lines 21(1-2) are utilized to show that the system control boards 15(1-2) are coupled to the switch 20, although it should be appreciated that, in other embodiments, the boards 15(1-2) may be coupled to the switch 20 in any of a variety of ways, including by edge connectors, cables, or other available interfaces.

In the illustrated embodiment, the system 10 includes two control boards 15(1-2), one for managing the overall operation of the system 10 and the other to provide redundancy and automatic failover in the event that the other board fails. Although not so limited, in the illustrated embodiment, the first system control board 15(1) serves as a "main" system control board, while the second system control board 15(2) serves as an alternate hot-swap replaceable system control board. In one embodiment, during any given moment, generally one of the two system control boards 15(1-2) actively controls the overall operations of the system 10. If failures of the hardware or software occur on the main system control board 15(1), or failures on any hardware control path from the main system control board 15(1) to other system devices occur, the system controller failover software 22 automatically triggers a failover to the alternative control board 15(2).

The system 10, in one embodiment, includes a plurality of system board sets 29(1-n) that are coupled to the switch 20, as indicated by lines 50(1-n). The system board sets 29(1-n) may be coupled to the switch 20 in one of several ways, including edge connectors or other available interfaces. The switch 20 may serve as a communications conduit for the plurality of system board sets 29(1-n), half of which may be connected on one side of the switch 20 and the other half on the opposite side of the switch 20.

The switch 20, in one embodiment, may be an 18×18 crossbar switch that allows system board sets 29(1-n) to communicate with each other, if desired. The two system control boards 15(1-2) may communicate with other system board sets 29(1-n) as well as through the switch 20 over a network-based connection, for example.

The system board sets 29(1-n), in one embodiment, comprise one or more boards, including a system board 30, I/O board 35, and expander board 40. The system board 30 and the I/O board 35 are hereinafter also referred to as "slot 0" board and "slot 1" board, respectively, as these boards 30, 35, in the illustrated embodiment, interface with a first and second slot (not shown) of the expander board 40, which in turn interfaces with the switch 20. The system board 30 may include processors and associated memories for executing, in one embodiment, applications, including portions of an operating system. The I/O board 35 may manage I/O cards, such as peripheral component interface cards and optical cards that are installed in the system 10. The expander board 40, in one embodiment, generally acts as a multiplexer (e.g., 2:1 multiplexer) to allow both the system and I/O boards 30, 35 to interface with the switch 20, which, in some instances, may have only one slot for interfacing with both boards 30, 35.

In one embodiment, the system 10 may be dynamically subdivided into a plurality of system domains, where each domain may have a separate boot disk (to execute a specific instance of the operating system, for example), separate disk storage, network interfaces, and/or I/O interfaces. Each domain, for example, may operate as a separate machine that performs a variety of user-configured services. For example, one or more domains may be designated as an application server, a web server, database server, and the like. In one embodiment, each domain may run its own operating system (e.g., Solaris operating system) and may be reconfigured without interrupting the operation of other domains.

Figure 2:
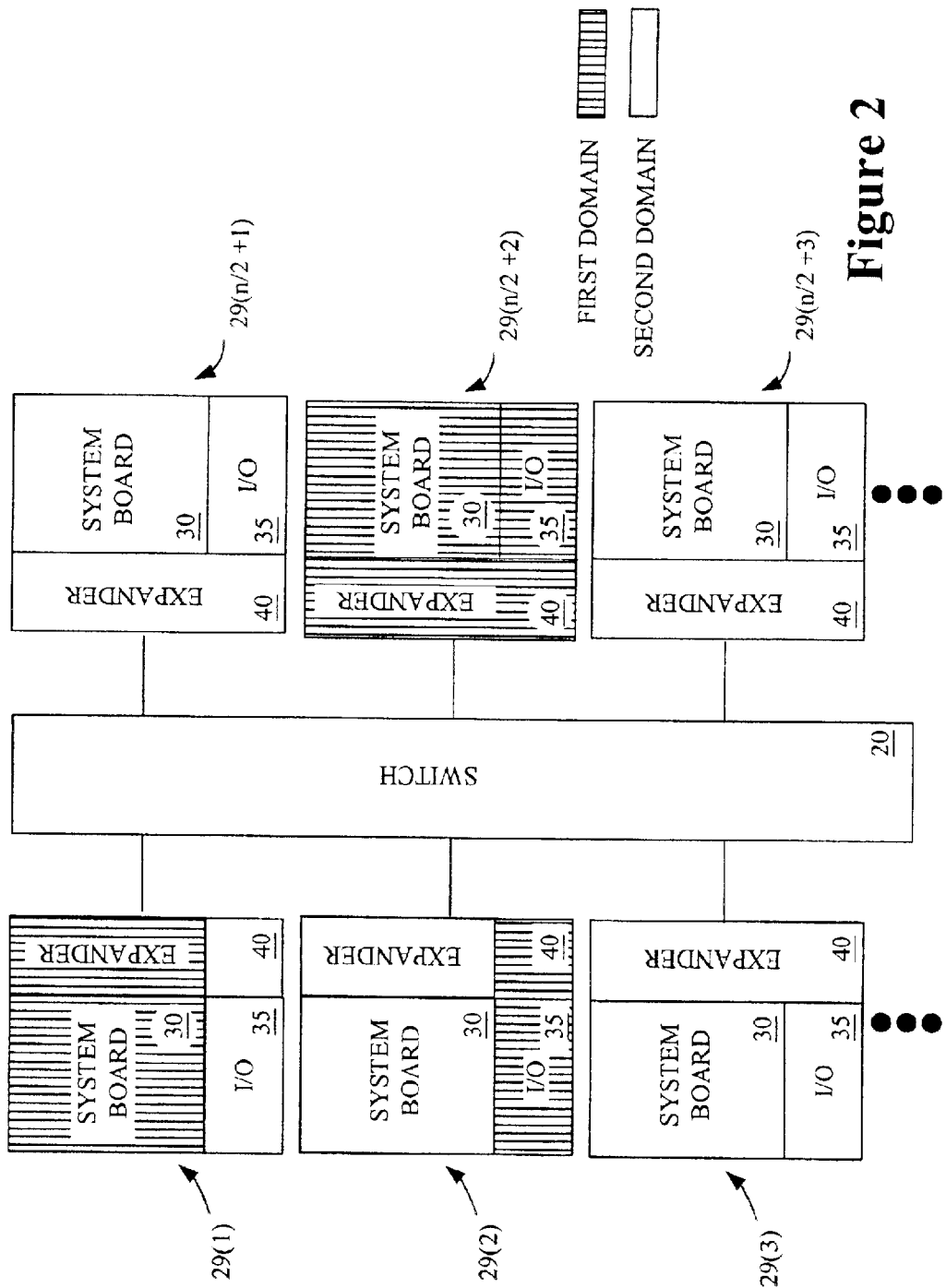
FIG. 2 illustrates a block diagram of an exemplary domain configuration that may be employed in the system of FIG. 1, in accordance with one embodiment of the present invention.

FIG. 2 illustrates an exemplary arrangement where at least two domains are defined in the system 10. The first domain, identified by vertical cross-sectional lines, includes the system board set 29(n/2+2), the system board 30 of the system board set 29(1), and the I/O board 35 of the system board set 29(2). The second domain in the illustrated embodiment includes the system board sets 29(3), 29(n/2+1), and 29(n/2+3), as well as the I/O board 35 of the system board set 29(1) and the system board 30 of the system board set 29(2).

As shown, a domain may be formed of an entire system board set 29(1-n), one or more boards (e.g., system board 30, I/O board 35) from selected system board sets 29(1-n), or a combination thereof Although not necessary, it may be possible to define each system board set 29(1-n) as a separate domain. For example, if each system board set 29(1-n) were its own domain, the system 10 may conceivably have up to "n" (i.e., the number of system board sets) different domains. When two boards (e.g., system board 30, I/O board 35) from the same system board set 29(1-n) are in different domains, such a configuration is referred to as a "split expander." The expander board 40 of the system board sets 29(1-n), in one embodiment, keeps the transactions separate for each domain. No physical proximity may be needed for boards in a domain.

The system 10 allows dynamic configuration of one or more domains. Additionally, in one embodiment, the resources (e.g., boards 30, 35, and 40, and the like) may be dynamically added or removed from a configured domain. Although not so limited, in the illustrated embodiment, the system 10 supports at least three different types of domains: conventional domains, client domains, and shared resource domains (SRD). As is described in more detail below, each client domain may communicate with other client domains through a SRD. In contrast, in the illustrated embodiment, conventional domains do not communicate to other domains within the system 10 except through a standard network connection.

Using the switch 20, inter-domain and intra-domain communications may be possible. For example, the switch 20 may provide a high-speed communications path so that data may be exchanged between the first domain and the second domain of FIG. 2. In one embodiment, a separate path for data and address through the switch 20 may be used for inter-domain and intra-domain communications.

Figure 3A:
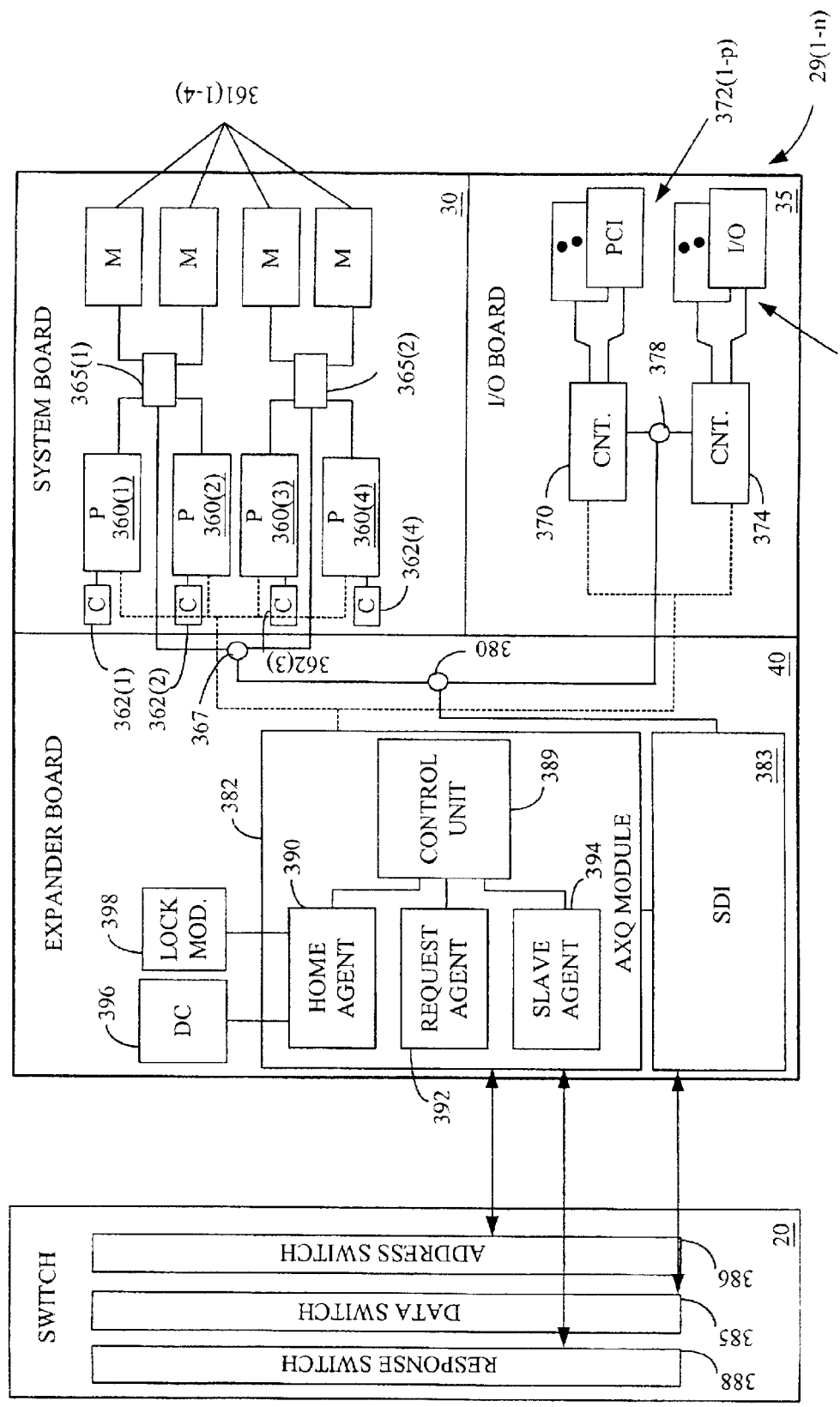
FIG. 3A depicts a stylized block diagram of one system board set that may be employed in the system of FIG. 1, in accordance with one embodiment of the present invention.

Referring now to FIG. 3A, a block diagram of the system board set 29(1-n) coupled to the switch 20 is illustrated, in accordance with one embodiment of the present invention. The system board 30 of each system board set 29(1-n) in the illustrated embodiment includes four processors 360(1-4), with each of the processors 360(1-4) having an associated memory 361(1-4). In one embodiment, each of the processors 360(1-4) may be coupled to a respective cache memory 362(1-4). In other embodiments, each of the processors 360(1-4) may have more than one associated cache memory 362(1-4), wherein some or all of the one or more cache memories 362(1-4) may reside within the processors 360(1-4). In one embodiment, each cache memory 362(1-4) may be a split cache, where a storage portion of the cache memory 362(1-4) may be external to the processors 360(1-

4), and a control portion (e.g., tags and flags) may be resident inside the processors 360(1-4).

The processors 360(1-4), in one embodiment, may be able to access their own respective memories 361(1-4) and 362(1-4), as well as access the memories 361(1-4) associated with other processors 360(1-4). In one embodiment, a different number of processors 360(1-4) and memories 362(1-4) may be employed in any desirable combination, depending on the implementation. In one embodiment, two five-port dual data switches 365(1-2) connect the processor/memory pairs (e.g., processors 360(1-2)/memories 361(1-2) and processors 360(3-4)/memories 361(3-4)) to a board data switch 367.

Although not so limited, the I/O board 35 of each system board set 29(1-n), in the illustrated embodiment, includes a controller 370 for managing one or more of the PCI cards that may be installed in one or more PCI slots 372(1-p). In the illustrated embodiment, the I/O board 35 also includes a second controller 374 for managing one or more I/O cards that may be installed in one or more I/O slots 376(1-o). The I/O slots 376(1-o) may receive optics cards, network cards, and the like. The I/O board 35, in one embodiment, may communicate with the system control board 15(1-2) (see FIG. 1) over an internal network (not shown).

The two controllers 370, 374 of the I/O board 35, in one embodiment, are coupled to a data switch 378. A switch 380 in the expander board 40 receives the output signal from the switch 378 of the I/O board 35 and from the switch 367 of the system board 30 and provides it to a System Data Interface (SDI) 383, in one embodiment. The SDI 383 may process data transactions to and from the switch 20 and the system and I/O boards 30 and 35. A separate address path (shown in dashed lines) is shown from the processors 360(1-4) and the controllers 370, 374 to an Address Expander Queue (AXQ) module 382. The AXQ module 382 may process address and response transactions to and from the switch 20 and the system and I/O boards 30 and 35.

In one embodiment, the switch 20 may include a data switch 385, address switch 386, and response switch 388 for transmitting respective data, address, and control signals provided by the AXQ module 382 and/or the SDI 383 of each expander board 40 of the system board sets 29(1-n). Thus, in one embodiment, the switch 20 may include three 18×18 crossbar switches that provide a separate data path, address path, and control signal path to allow intra- and inter-domain communications. Using separate paths for data, addresses, and control signals, may reduce the interference among data traffic, address traffic, and control signal traffic. In one embodiment, the switch 20 may provide a bandwidth of about 43 Gigabytes per second. In other embodiments, a higher or lower bandwidth may be achieved using the switch 20.

The AXQ module 382, in one embodiment, includes a control unit 389 coupled to a home agent 390, a request agent 392, and a slave agent 394. Collectively, the agents 390, 392, 394 may operate to aid in maintaining system-wide coherency. In the illustrated embodiment, the control unit 389 of the AXQ module 382 interconnects the system board 30 and the I/O board 35 as well as interconnects the home agent 390, request agent 392, slave agent 394 within the AXQ module 382. In one embodiment, if the expander board 40 is split between two domains (i.e., the system and the I/O boards 30 and 35 of one system board set 29(1-n) are in different domains), the control unit 389 of the AXQ module 382 may arbitrate the system board 30 and I/O board 35 separately, one on odd cycles, and the other on even cycles.

The AXQ module 382, in one embodiment, controls a directory cache (DC) 396 that holds information about lines of memory that have been recently referenced. The DC 396, in one embodiment, may be stored in a volatile memory, such as a static random access memory (SRAM). The DC 396 may be a partial directory in that it may not have enough entry slots to hold all of the cacheable lines that are associated with a given expander board 40. The AXQ module 382 controls a locking module 398 that prevents access to a selected entry in the directory cache 396 when the status of that entry, for example, is being updated.

Domains may be defined to include one or more system board sets 29(1-n). As such, depending on the configuration, a single domain may have multiple expander boards 40 associated with that one domain. Accordingly, an expander board 40 from one system board set 29(1-n) may initiate a memory transaction to access information from an expander board 40 of another system board set 29(1-n) within that domain. In the system 10, in one embodiment, one of a variety of memory access transactions may be initiated, including, but not limited to, request-to-own (RTO), request-to-share (RTS), WriteStream, WriteBack, and ReadStream transactions. The one or more of the aforementioned memory access transactions may be local or remote transactions, where local transactions may include transactions that are broadcast locally within the system board set 29(1-n) and remote transactions may include transactions that are intended to access cache lines from other system board sets 29(1-n). Although not so limited, in the illustrated embodiment, an RTO may be issued to obtain an exclusive copy of a cache line, a RTS to obtain a shared copy of a cache line, a WriteBack transaction to write the cached line back to the home board, a ReadStream request to get a snapshot copy of the cache line, and a WriteStream request to write a copy of the cache line.

Typically, each expander board 40 in a given domain serves as "home expander board" for memory lines within a selected memory address range. Expander boards 40 belonging to the same domain are able to access each other's memory contents. In any given transaction, a home expander board, a requesting expander board, and a slave expander board may be involved, as described in more detail below. The "requesting expander board," as utilized herein, represents the expander board 40 that attempts to access a selected memory line belonging to the home expander board. The term "memory line," as utilized herein, may include data that is stored in the caches 362(1-4) and/or memory 361(1-4) of the system board 30. The requesting board may initiate, for example, one of a variety of memory access transactions, including request to own (RTO), request to share (RTS), WriteStream, WriteBack, and ReadStream transactions. The "slave expander board," as utilized herein, represents a board that currently has a copy of the memory line that the requesting expander board is attempting to access. In a case where a current copy of the requested memory line resides in the home expander board, the home expander board may also be the slave expander board for that transaction.

Primary domain protection, in the illustrated embodiment, is accomplished in the AXQ module 382 by checking each transaction for domain validity when a transaction is first detected. The SDI 383, in one embodiment, may also screen transfer requests for valid destinations. If a transgression error is detected in the AXQ module 383, the operation is treated like a request to nonexistent memory. The request is then re-issued without asserting a mapped coherency protocol signal.

It should be noted that the arrangement and/or location of various components (e.g., AXQ module 382, processors 360(1-4), controllers 370, 374) within each system board set 29(1-n) is a matter of design choice, and thus may vary from one implementation to another. Additionally, more or fewer components may be employed without deviating from the scope of the present invention.

Figure 3B:
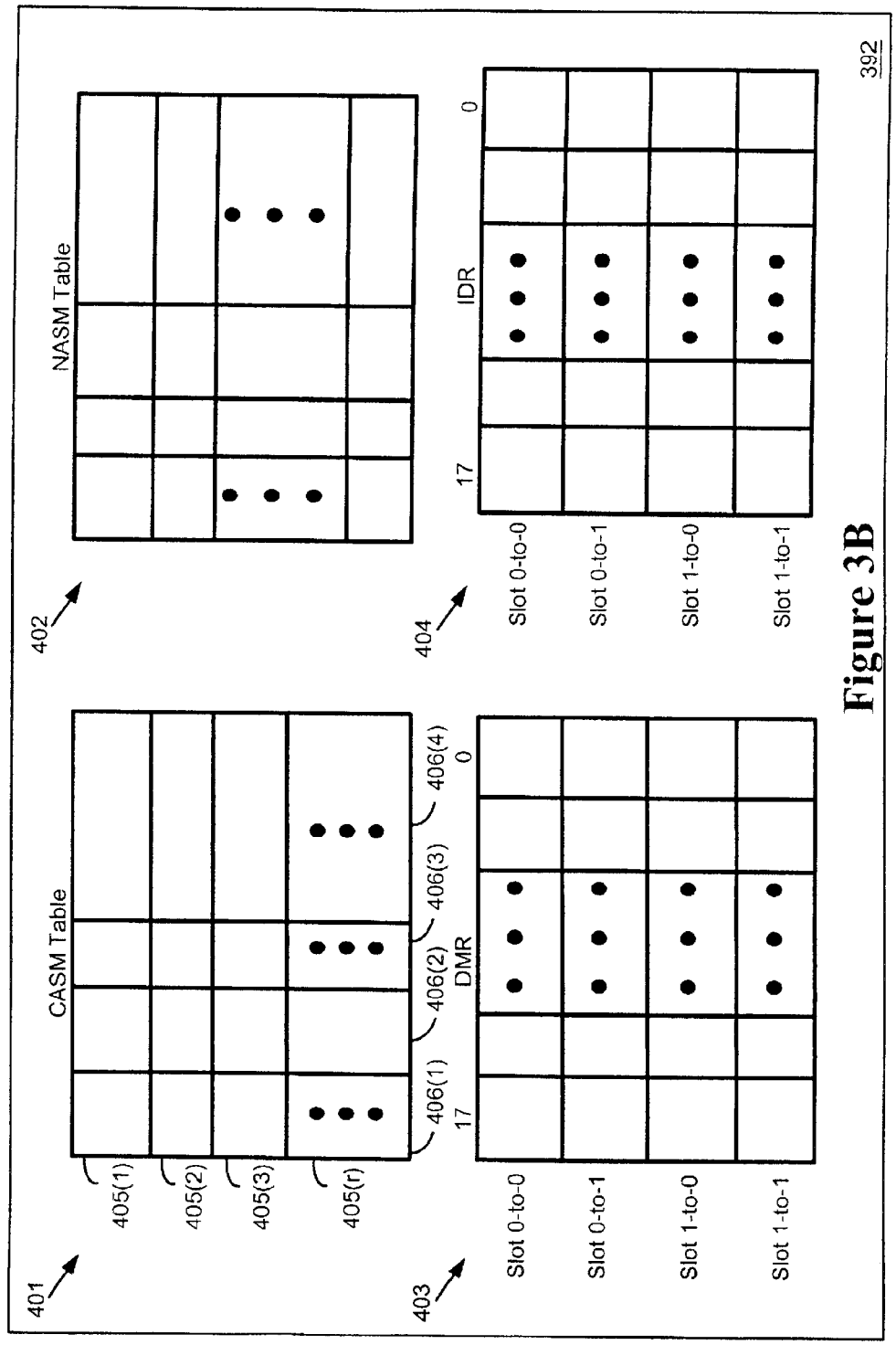
FIG. 3B illustrates a block diagram of a request agent that may be employed in an expander board of the system board set of FIG. 3A, in accordance with one embodiment of the present invention.

Referring now to FIG. 3B, a block diagram of one embodiment of the request agent 392 of FIG. 3A is illustrated. The request agent 392, in the illustrated embodiment, includes a cacheable address slot map (CASM) table 401, non-cacheable address slot map (NASM) table 402, domain match registers (DMR) table 403, and interrupt domain registers (IDR) table 404. In the illustrated embodiment, each domain has its own CASM table 401, and all of the expander boards 40 within the same domain include the CASM table 401 with the same contents.

The CASM table 401 indicates whether a requesting device (e.g., the slot "0" board 30 and the slot "1" board 35) on a given expander board 40 is allowed to access a particular address range. The CASM table 401 of FIG. 3B includes a plurality of entries 405(1-r) that are indexable by selected address bits (e.g., 41:37) that represent a logical slice number. A "slice" generally corresponds to a particular portion of an addressable memory space. Although not so limited, in the illustrated embodiment, slices 0 through 17 are valid, and thus addresses in slice 18 and above will be unmapped. Mapping a particular slice to physical board numbers is established initially by the system controller board 15(1-2) and used to set up the CASM tables 401 in each AXQ module 382. This mapping may be altered by system register accesses to the AXQ module 382, as long as the change does not alter domain protection.

In the illustrated embodiment, each entry 405(1-r) of the CASM table 401 includes a first permission bits field 406(1), a second permission bits field 406(2), a valid field 406(3), and expander number field 406(4). The first permission bits field 406(1) defines the permission rights for transactions that originate from the slot 0 board 30 for that expander board 40, and the second permission bits field 406(2) defines the permission rights for transactions that originate from the slot 1 board 35 for that expander board 40. For example, a value of "00" in the permission bits fields 406(1-2) may indicate that neither the slot 0 board 30 nor the slot 1 board 35 has permission to access memory space within the requested address range. Similarly, a value of "01" may indicate that the slot 0/slot 1 board 30, 35 has limited access rights, such as only ReadStream/WriteStream rights. A value of "11" in the permission bits fields 406(1-2) may indicate that the slot 0/slot 1 board 30, 35 has full permission to requested access memory space. Although in the illustrated embodiment a separate field 406(1-2) is used to define access rights for each of the slot 0 and slot 1 boards 30, 35, in alternative embodiments, additional or fewer fields may be employed.

In one embodiment, a value of "01" in the permission bits fields 406(1-2) in the CASM table 401 may also indicate that the slot 0/slot 1 board 30, 35 of an SRD may issue a RTS transaction to another domain in the domain set, but such a transaction may be allowed only as a ReadStream transaction. As such, the home memory delivers a current copy of the cache line but does not mark it shared. When the line is modified in the future, a no invalidate will be sent to the SRD. The processors 360(1-4) of the SRD, however, assume that an RTS was performed, and store the line in its cache 362(1-4) in a shared state. It is up to software to invalidate this cached copy when appropriate. This facility allows the processors 360(1-4) to use prefetch instructions to improve its bcopy loop (the use of which is discussed below).

As mentioned, the request agent 392 uses permission bits in the entry 406(1-2) to determine if domain protection will allow that operation to that address slice. If not, the request agent 392 re-issues the request without asserting mapped, which means that the transaction is not allowed or invalid. Additionally, the request agent 392 uses selected address bits (e.g., bits 41:37) to look up in the CASM table 401 to determine the home expander board for each transaction. The home expander board is identified in the expander number field 406(4) in the CASM table 401. The valid field 406(3) of the CASM table 401 indicates whether that particular entry 405(1-r) is valid.

Non-cacheable memory space transactions between domains are controlled by the NASM table 402. The "non-cacheable address space" includes device configuration areas, PCI space, ASIC register space, bootbus space, and the like.

The DMR table 403 identifies expander boards 40 that are in the same domain. The DMR table 403 controls device configuration access, CASM table 401 updates, and allows slave access from the home agent 390. In the illustrated embodiment, the masks are grouped by board type (e.g., slot 0-to-1 board, slot 0-to-0, etc.,). The expander board number is looked up in the appropriate mask and a "1" identifies that the slot 0/slot 1 boards 30, 35 are in the same domain for that expander board 40. For example, a mask bit "n" equal to "1" for slot-0-to-1 in the DMR table on expander "m" means that the slot 1 board 35 of expander board n is in the same domain as the slot 0 board 30 of the expander board n.

The IDR table 404 controls interrupt transactions between domains. In the illustrated embodiment, the masks are grouped by board type (e.g., a slot 0 board 30 interrupting a slot 1 board 35, a slot 1 board 35 interrupting a slot 0 board 30, a slot 0 board 30 interrupting a slot 0 board 30, a slot 1 board 35 interrupting slot 1 board 35). Accordingly, the IDR table 404 includes a plurality (eighteen in the illustrated example) of slots for each board type. The destination expander board number is looked up in the appropriate mask and a "1" bit allows the interrupt to occur. For example, a mask bit "n" equal to "1" for slot-0-to-1 means that the slot 1 board 35 of expander board n may be interrupted by the slot 0 board 30 of the expander board n.

The SRD, in one embodiment, provides the "keys" (i.e., access rights) to the memory/interrupt resources of the client domain. The memory/interrupt resources may include the CASM table 410, NASM table 402, DMR table 403, and IDR table 404. In the illustrated embodiment, the "keys" are provided to the SRD by the system control board 15(1-2) through a local interface, such as the JTAG interface, and may be accomplished by the "linkdomain" command.

In one embodiment, if a shared resource domain is persistently prevented from performing useful work by continuous interrupts by a rogue domain, the shared resource domain may request the system control board 15(1-2) to reset the masks in the IDR table 404 so that the rogue domain cannot send the interrupts.

Figure 4A:
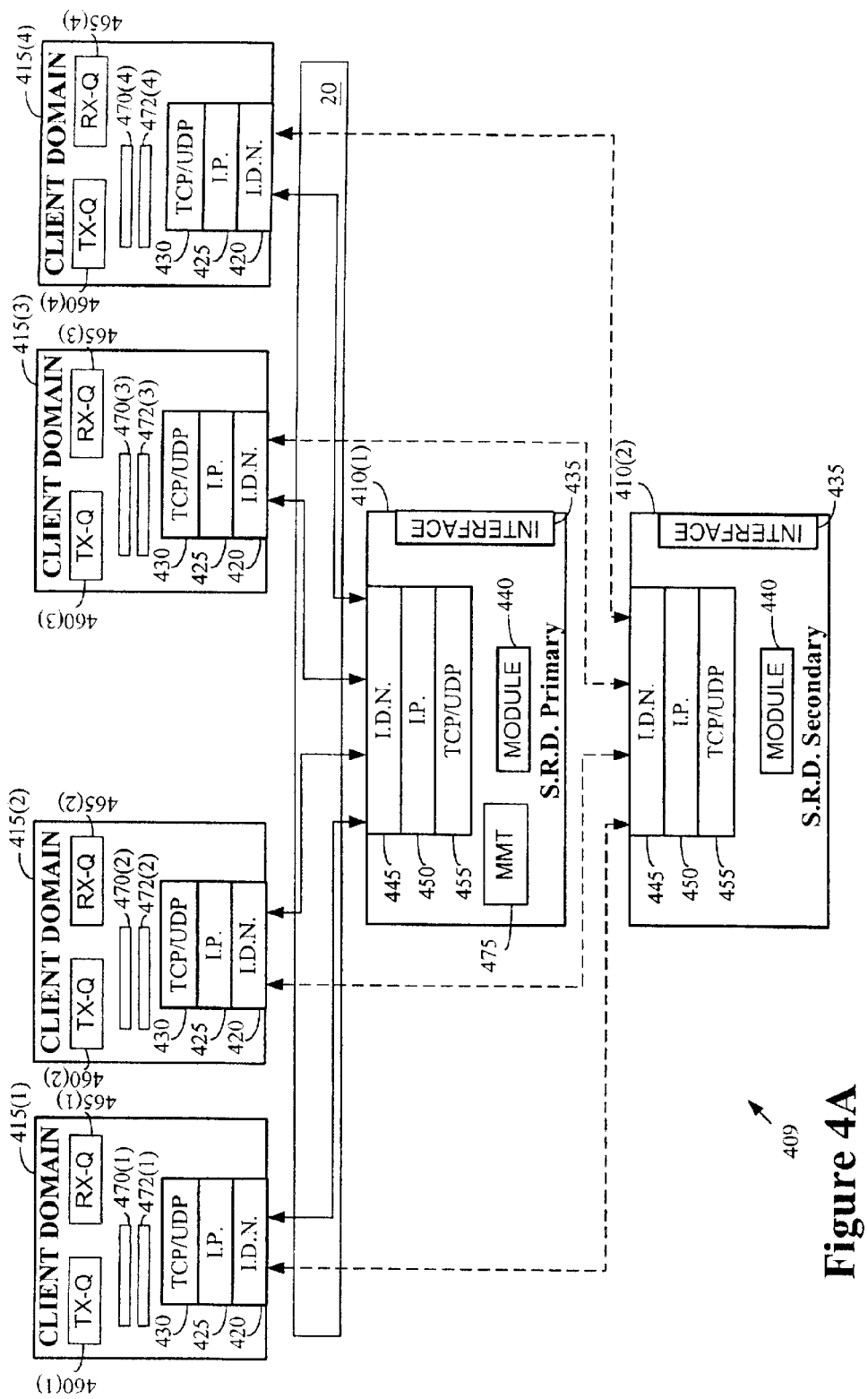
FIG. 4A illustrates a block diagram of a domain set configuration of the system of FIG. 1, in accordance with one embodiment of the present invention.

Referring now to FIG. 4A, an exemplary configuration arrangement of a domain set 409 is shown. A "domain set," as utilized herein, refers to a collection of one or more SRDs 410(1-2) and one or more client domains 415(1-4) under the control of the SRDs 410(1-2). As mentioned above, each of the SRDs 410(1-2) and client domains 415(1-4) may be formed of an entire system board set 29(1-n) (see FIG. 1), one or more boards (e.g., system board 30, P/O board 35) from selected system board sets 29(1-n), or a combination thereof.

In the illustrated embodiment, the domain set 409 includes four client domains 415(1-4) that communicate with each other through the primary SRD 410(1). The primary and secondary SRDs 410(1-2) are coupled to the client domains 415(1-4) through the switch 20, which may provide a high-speed connection for inter-domain communications. To provide failover, the domain set 409 includes the secondary SRD 410(2) in case of a fault in the primary SRD 410(1). It should be noted that even though the discussion herein makes references to communications between the client domains 415(1-4) and the SRDs 410(1-2), typically only one of the two SRDs 410(1-2) manages the client domains 415(1-4) during any given time. Although, in an alternative embodiment, it may be possible that both of the SRDs 410(1-2) may allow one or more client domains 415(1-4) to communicate with each other during any given time. However, some domain set configurations may not have a failover SRD.

Each client domain 415(1-4) includes an inter-domain networking (IDN) layer 420 to provide an IDN connection to communicate with the SRD 410(1-2). The IDN layer 420, in one embodiment, includes an IDN driver (not shown). Each client domain 415(1-4) may include an Internet Protocol (IP) stack 425 that interfaces with the IDN layer 420. One version of the IP stack 425 is described in Request for Comments (RFC) 791, entitled "Internet Protocol," dated September 1981. Other versions of IP, such as IPv6, or other packet-based standards may also be utilized in further embodiments. A version of IPv6 is described in RFC 2460, entitled "Internet Protocol, Version 6 (IPv6) Specification," dated December 1998. Packet-based networks such as IP networks communicate with packets, datagrams, or other units of data that are sent over the networks. Unlike circuit-switched networks, which provide a dedicated end-to-end connection or physical path for the duration of a call session, a packet-based network is one in which the same path may be shared by several network elements.

In the illustrated embodiment, each client domain 415(1-4) may include a higher layer protocol 430, such as Transmission Control Protocol (TCP) or User Datagram Protocol (UDP). The client domains 415(1-4) thus interface with the SRD 410(1-2) over an IDN connection using protocol layers 425, 430.

In the illustrated embodiment, the SRD 410(1-2) includes an interface 435 for communicating with one or more external devices (not shown). In one embodiment, the interface 435 may be a Wildcat™ cluster interface, which may link other systems (not shown) over a fiber optic connection, for example. The interface 435 may sometimes be expensive such that it may be cost-prohibitive to have such an interface integrated in every system board set 29(1-n) (see FIG. 1). As such, instead of installing the interface 435 in multiple system board sets 29(1-n), in accordance with one embodiment of the present invention, the interface 435 may be selectively installed on one or a few of the system board sets 29(1-n) that are configured as the SRD 410(1-2). Through the SRD 410(1-2), the client domains 415(1-4) may access the interface 435.

The SRD 410(1-2) allows inter-domain communications through the use of inter-domain memory transactions, as described in more detail below. In one embodiment, the SRD 410(1-2) manages the read and write transactions between and/or among one or more of the client domains 415(1-4).

In the illustrated embodiment, only the SRD 410(1-2) may access the client domains 415(1-4) in the domain set 409 (that is the client domains 415(1-4) cannot directly access the resources of one another). The processors 360(1-4) (see FIG. 3A) in the SRD 410(1-2) are capable of executing a software module 440 that manages the hardware settings and provides data from one client domain 415(1-4) to another. Accordingly, in the illustrated embodiment, the SRD 410(1-2) is a dynamic system domain that is capable of copying or moving data between client domains 415(1-4). In one embodiment, a maximum transfer unit (MTU) size of data or less can be transferred. The SRD 410(1-2) includes an IDN layer 445 that may contain an IDN driver that may be part of the boot configuration of the SRD 410(1-2). The SRD 410(1-2), in one embodiment, may use dynamic memory mapping to access memory 361(1-4) (see FIG. 3A) inside the client domains 415(1-4). The term "dynamic memory mapping," as utilized herein, refers to mapping memory for the duration of a connection between the SRD 410(1-2) and the client domain 415(1-4) or for the duration of a transaction between the SRD 410(1-2) and the client domain 415(1-4). Each SRD 410(1-2), in one embodiment, includes an IP layer 450, and a TCP/UDP layer 455 for communicating with one or more of the client domains 415(1-4).

Typically, a system administrator configures the domain set 409. That is, the system administrator designates the resources (e.g., boards 30, 35, 40) that define one or more client domains 415(1-4) and shared resource domains 410(1-2). Upon configuration and during initiation when the primary SRD 410(1) is connecting to the client domains 415(1-4), the primary SRD 410(1) creates, as noted below, a transmit queue 460(1-4) and a receive queue 465(1-4) for each client domain 415(1-4). As described in more detail below, the transmit queues 460(1-4) contain one or more tasks for the SRD 410(1-2) to complete, and the receive queues 465(1-4) contain one or more tasks for the respective client domain 415(1-4) to complete.

In one embodiment, queues 460(1-4) and 465(1-4) may be created as follows: the system control boards 15(1-2) identifies the configured client domains 415(1-4) to the SRD 410(1-2), which then sends an interrupt request to the configured client domains 415(1-4); in response to the request from the SRD 410(1-2), each configured client domain 415(1-4), via an interrupt, transmits its page frame number(s) (i.e., physical page(s) of memory) to the SRD 410(1-2); the SRD 410(1-2), in turn, maps the received PFNs as virtual memory. Those skilled in the art will appreciate mapping memory may be accomplished in different ways, depending on the operating system. In the Solaris operating system, for example, virtual memory mapping occurs at the hardware address translation layer.

The queues 460(1-4) and 465(1-4) of each client domain 415(1-4), in one embodiment, may be any storage space that is accessible to the SRD 410(1-2) and to the client domain 415(1-4) associated with those queues 460(1-4) and 465(1-4). In the illustrated embodiment, the SRD 410(1-2), during initiation, dynamically maps the queues 460(1-4) and 465(1-4). That is, a selected memory region in each client domain 415(1-4) is mapped into the SRD 410(1-2). The memory region may, for example, be the memory 361(1-4) (see FIG. 3A), and/or cache memory 362(1-4) that is associated with each client domain 415(1-4). In one embodiment, the queues 460(1-4) and 465(1-4) may remain dynamically mapped for the duration of the connection between the client domain 415(1-4) and the SRD 410(1-2). Although in the illustrated embodiment each client domain 415(1-4) includes two queues 460(1-4) and 465(1-4), in alternative embodiments a single queue may be employed for posting transmit and receive tasks.

The client domains 415(1-4), in the illustrated embodiment, each include a transmit buffer 470(1-4) and a receive buffer 472(1-4). The buffers 470(1-4) and 472(1-4), in one embodiment, may be streamed network buffers via which the network-layer protocol may transmit or receive data. The manner in which these buffers 470(1-4) and 472(1-4) are utilized to facilitate inter-domain communications is described in more detail below.

The SRD 410(1), in one embodiment, includes a memory map table 475 in which the virtual memory mapping information is stored. The memory map table 475 may include information on a per-client domain basis. That is, the memory map table 475 may include the page frame numbers from each configured client domain 415(1-4) for which memory has been mapped into the SRD 410(1-2). Although not shown, in one embodiment, the failover SRD 410(2) may also include information that is stored in the memory map table 475 of the primary SRD 410(1).

Referring now to FIGS. 4B-C, exemplary embodiments of the transmit and receive queues 460(1-4), 465(1-4) are illustrated. As shown, the transmit queue 460(1-4) includes a plurality of entries 477(1-m), with each entry 477(1-m) having a status field 478 and a message field 479. The client domain 415(1-4) posts tasks in the message field 479 for execution. The message field 479 may include information such as the action (e.g., transfer data, receive data, access a resource) to be performed, the source address of the data, the destination address, and the like. The SRD 410(1-2), in one embodiment, polls the transmit queue 460(1-4) to determine if any tasks need to be completed. If a task requires execution in the transmit queue 460(1-4), the SRD 410(1-2) executes that task, and then updates the corresponding status field 478 of that task. For example, in the illustrated example of FIG. 4B, the first entry 477(1) is marked "complete" by the SRD 410(1-2). The client domain 415(1-4) may thus remove completed entries from the transmit queue 460(1-4). It should be appreciated that, in one embodiment, a single bit (e.g., "0" for complete, and a non-zero bit for incomplete) may be utilized to indicate the status of the task.

The receive queue 465(1-4), as shown, includes a plurality of entries 480(1-g), with each entry 480(1-g) having a status field 481 and a message field 482. The SRD 410(1-2) posts tasks in the receive queue 465(1-4) that are intended to be completed by the client domain 415(1-4). The message field 482 may include information such as the action (e.g., transfer data, receive data, access a resource) to be performed, the source address of the data, the destination address, and the like. The client domain 415(1-4), in one embodiment, polls the receive queue 465(1-4) to determine if any tasks need to be completed. If a task requires execution, the client domain 415(1-4) executes that task, and then updates the corresponding status field 481 of that task. For example, in the illustrated example of FIG. 4B, the first and second entries 480(1-2) are marked "incomplete," which means that there are two tasks currently pending in the receive queue 465(1-4) for execution by the client domain 415(1-4). Once completed, the tasks are removed from the receive queue 465(1-4).

In an alternative embodiment, instead of the SRD 410(1-2) polling the transmit queue 460(1-4) to check for messages, each client domain 415(1-4) may post a message in the transmit queue 460(1-4) and then generate an interrupt to inform the SRD 410(1-2) of the pending message. Similarly, instead of having the client domain 415(1-4) poll the receive queue 465(1-4), the SRD 410(1-2) may generate an interrupt every time a message is posted in the receive queue 465(1-4) of the client domain 415(1-4), thereby notifying the client domain 415(1-4) of the newly posted message.

Figure 5:
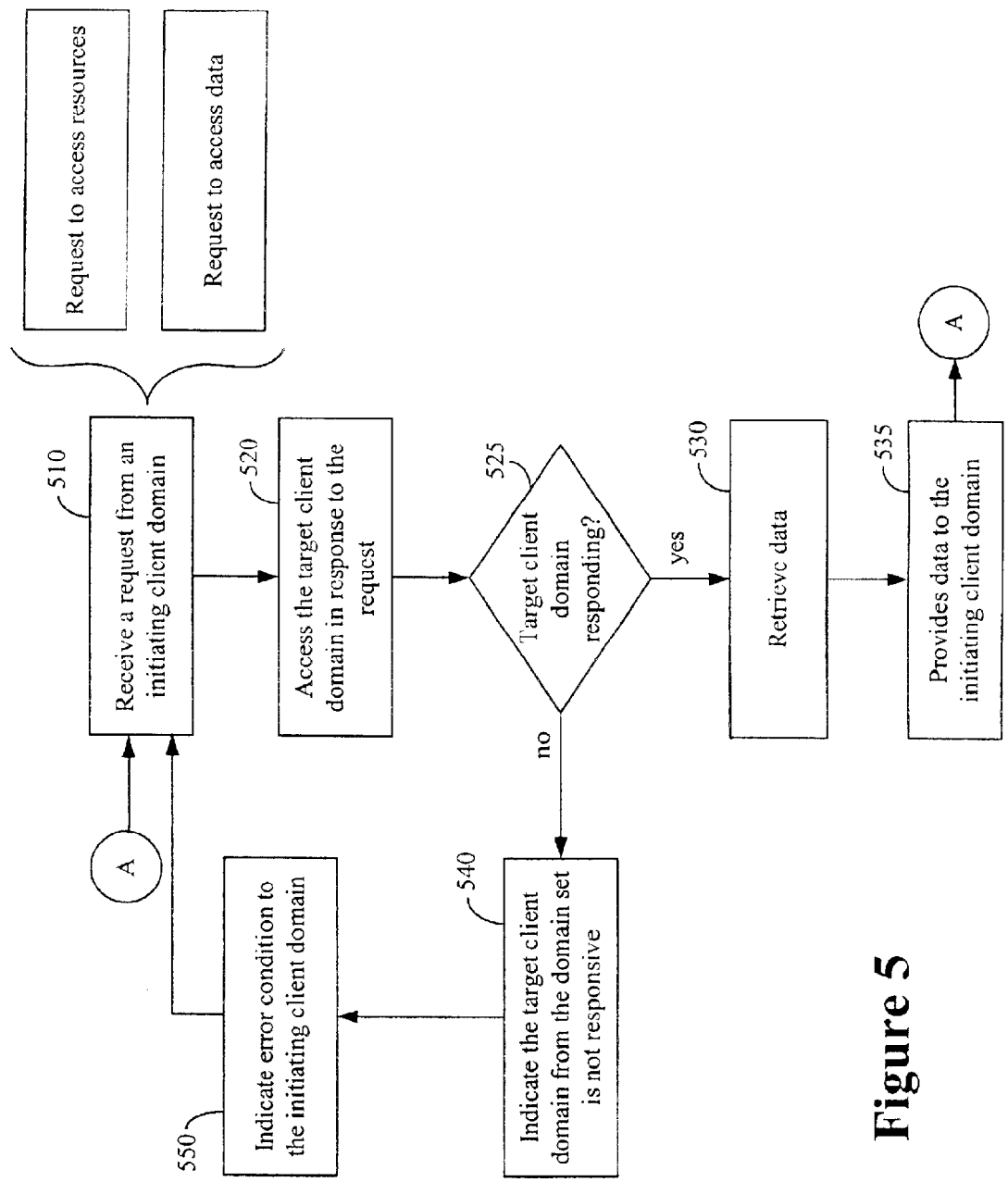
FIG. 5 illustrates a flow diagram of a method of inter-domain communications in the domain set of FIG. 4A, in accordance with one embodiment of the present invention.

Referring now to FIG. 5, a flow diagram of a method of allowing inter-domain communications in the domain set 409 of FIG. 4A is illustrated, in accordance with one embodiment of the present invention. The primary SRD 410(1) receives (at 510) a request from an initiating client domain 415(1-4). In one embodiment, the client domain 415(1-4) that initiates the request may use an interrupt to indicate to the primary SRD 410(1) of the pending request. Alternatively, the primary SRD 410(1) may poll each of the defined client domains 415(1-4) periodically for requests.

The request received (at 510) may be, for example, a request to access resources (e.g., hardware or data) of the other client domains 415(1-4). For example, in one embodiment, the first client domain 415(1), may request (at 510) to receive data from and/or transmit data to the fourth client domain 415(4). In one embodiment, the one or more client domains 415(1-4) may access resources in the SRD 410(1-2), resources such as the interface 435. Although not so limited, for illustrative purposes, it is herein assumed that the initiating client domain 415(1-4) requests (at 510) data from another client domain (i.e., referred to as "target client domain") 415(1-4).

The primary SRD 410(1) accesses (at 520) the target client 415(1-4) in response to the request that was received (at 510) by the primary SRD 410(1). The step of accessing (at 520) the target client domain 415(1-4) may include the primary SRD 410(1), for example, accessing the memory 361(1-4) of the target client domain 415(1-4) to retrieve the data requested (at 510) by the initiating client domain 415(1-4). The SRD 410(1) determines (at 525) whether the target client domain 415(1-4) is responsive. In one embodiment, the SRD 410(1) may attempt to access the target client domain 415(1-4) for a preselected amount of time (which may be programmable) to determine (at 525) if the target domain 415(1-4) is responsive. An unsuccessful attempt to access the target client domain 415(1-4) within the preselected amount of time may be an indication that target client domain 415(1-4) is not responsive, either because that domain 415(1-4) is not operational or because the connection between the primary SRD 410(1) and that domain 415(1-4) is faulty.

In some instances, the client domains 415(1-4) (or the SRD 410(1-2)) may be non-responsive if such domains have a "domain stop," which may be caused by fatal errors. A "domain stop" shuts down the domain 415(1-4)/410(1-2) quickly and efficiently when the hardware detects an unrecoverable error in the hopes of reducing further corruption of data and in the hopes of facilitating debugging by not allowing the domain to continue running, which could make it harder to determine the source of the failure. In the illustrated embodiment, a "domain stop" operates by shutting down the paths in and out of the AXQ module 382 and SDI module 383 (see FIG. 3A).

If the target client domain 415(1-4) is responsive (at 525), then the primary SRD 410(1) retrieves (at 530) the data from the target client domain 415(1-4). The primary SRD 410(1) then provides (at 535) the data retrieved (at 530) from the target client domain 415(1-4) to the initiating client domain 415(1-4). The primary SRD 410(1), in one embodiment, copies the data retrieved (at 530) from the target client domain 415(1-4) into the memory 361(1-4) of the initiating client domain 415(1-4).

If the primary SRD 410(1) determines (at 525) that the target domain is not responsive, then the primary SRD 410(1) indicates (at 540) such to the system control board 15(1-2) (see FIG. 1). The primary SRD 410(1) may then indicate (at 550) an error condition to the initiating client domain 415(1-4), thereby informing the initiating client domain 415(1-4) that the request received (at 510) may not be successfully serviced. The primary SRD 410(1) may receive (at 510) other requests from other client domains 415(1-4).

Although FIG. 5 illustrates a method of transferring data from one client domain 415(1-4) to another client domain 415(1-4), a similar method may also be employed for receiving data from client domains 415(1-4). For example, the client domain 415(1-4) requesting data from another client domain 415(1-4) may first indicate to the SRD 410 (1-2) that selected data is desired from another client domain 415(1-4). The requesting client domain 415(1-4) may indicate to the SRD 410(1) of such a request using interrupts or polling. Once the SRD 410(1) is notified of the request, the SRD 410(1) may retrieve the requested data from the remote client domain 415(1-4) and provide it to the requesting client domain 415(1-4). Such a transfer may be facilitated by dynamically mapping the memory of the client domains 415(1-4) into the SRD 410(1), in one embodiment.

As mentioned, in the illustrated embodiment, the SRD 410(1-2) facilitates transfers of data from one client domain 415(1-4) to another. By managing inter-domain data transfers, the SRD 410(1-2) is able to provide error isolation between the client domains 415(1-4). Thus, if a client domain 415(1-4) stops responding, the SRD 410(1-2) is able to tolerate the lack of responses from that domain. Additionally, if the primary SRD 410(1) stops responding, the client domains 415(1-4) are able to tolerate a lack of response from the primary SRD 410(1). In the case where the primary SRD 410(1) stops responding, the secondary SRD 410(2) assumes the management functions.

Referring now to FIG. 6, a flow diagram of an alternative method of allowing inter-domain communications in the domain set 409 of FIG. 4A is illustrated, in accordance with one embodiment of the present invention. For ease of illustration, it is herein assumed that one of the client domains 415(1-4) (referred to as the "source" client domain 415(1-4)) is transmitting data to one of the other client domains 415(1-4) (referred to as the "destination" client domain 415(1-4)). It should, however, be appreciated that a similar method may be employed when one of the client domains 415(1-4) wishes to receive data from another client domain 415(1-4).

The transmit queue 460(1-4) and the receive queue 465 (1-4) are mapped (at 610) for each of the client domains 415(1-4) in the SRD 410(1-2). As such, each queue 460(1-4), 465(1-4) of the client domain 415(1-4) may be accessed by that client domain 415(1-4) as well as the SRD 410(1-2). However, the client domains 415(1-4) are not able to access each other's queues 460(1-4), 465(1-4), in the illustrated embodiment.

The SRD 410(1-2) polls (at 620) the transmit queue 460(1-4) of each of the configured client domains 415(1-4) for new messages. As mentioned, the messages, which are posted in the transmit queue 460(1-4) by its respective client domain 415(1-4), contain a task for the SRD 410(1-2) to complete. In one embodiment, the SRD 410(1-2) may sequentially poll the transmit queue 460(1-4) of each client domain 415(1-4). Alternatively, the SRD 410(1-2) may poll the transmit queue 460(1-4) of each client domain 415(1-4) according to a user-defined order that may be based, for example, on a priority scheme designated by the user.

The SRD determines (at 625) if any new messages have been posted in the transmit queue 460(1-4) of the client domains 415(1-4). If the SRD determines (at 625) that no new messages have been posted in the transmit queue 460(1-4) of the client domain 415(1-4), then the SRD 410(1-2) once again polls (at 620) the transmit queue 460(1-4) of the client domains 415(1-4). The polling process may continue until the SRD 410(1-2) determines (at 625) that a new message has been posted in the transmit queue 460(1-4) of the client domain 415(1-4). Once the SRD 410(1-4) determines (at 625) that a new message has been posted in the transmit queue 460(1-4) of the client domain 415(1-4), the SRD 410(1-2) executes (at 630) the task posted in the message. A more detailed embodiment of the act of executing (at 630) the task is described below with reference to FIG. 7.

Referring again to FIG. 6, once the task is successfully executed (at 630) by the SRD 410(1-2), the SRD 410(1-2) updates (at 632) the status field 478 (see FIG. 4B) of the transmit queue 460(1-4) that contained the task. The status field 478 of the transmit queue 460(1-4) may be updated to indicate that the task has been completed, for example. The client domain 415(1-4) for which the task is completed, in one embodiment, removes (at 635) the task from its transmit queue 460(1-4). In an alternative embodiment, the SRD 410(1-2), as opposed to the client domain 415(1-4), may remove (at 635) the task from the transmit queue 460(1-4) once the task has been completed. It should be noted that if the SRD 410(1-2) removes (at 635) the task from the transmit queue 460(1-4) of the client domain 415(1-4), then the status field 478 may not be needed in the transmit queue 460(1-4) as the SRD 410(1-2) may routinely remove the task once the task has been completed.

Figure 7:
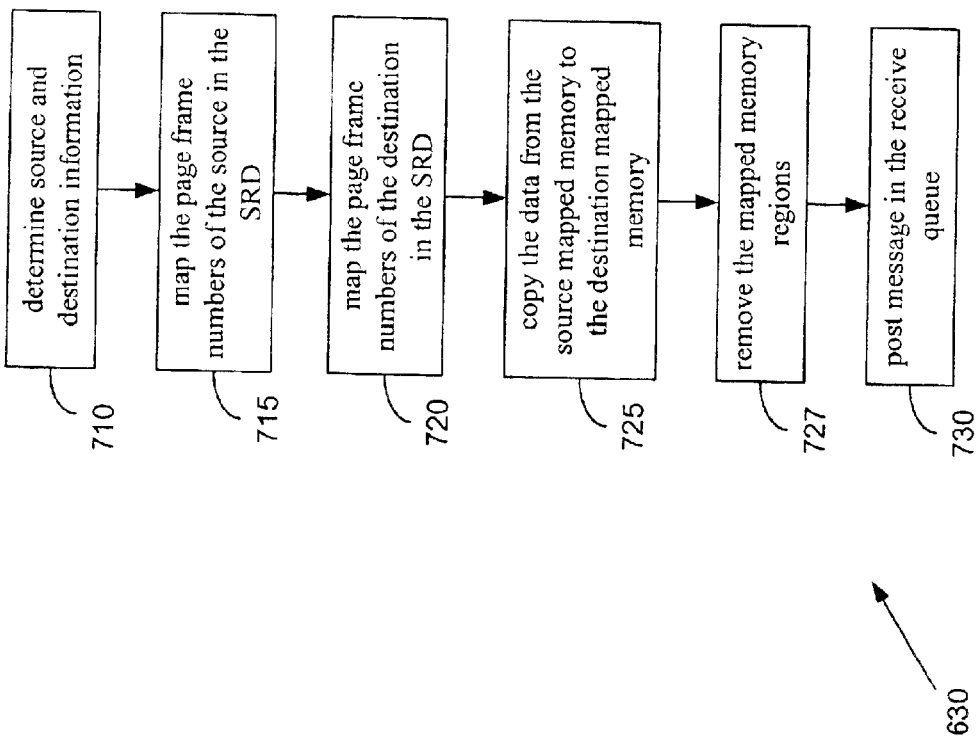
FIG. 7 depicts a flow diagram of an alternative method for allowing inter-domain communications, in accordance with one embodiment of the present invention.

Referring now to FIG. 7, a flow diagram of the block 630 of FIG. 6 is illustrated, in accordance with one embodiment of the present invention. The SRD 410(1-2) determines (at 710) the information regarding the source and destination client domains 415(1-4). As mentioned earlier, for ease of illustration, it is herein assumed that the source client domain 415(1-4) is transmitting data to the destination client domain 415(1-4). As such, in one embodiment, the message field 479 of the transmit queue 460(1-4) of the source client domain 415(1-4)) may include information such as page frame numbers of the transmit buffer 470(1) of the source client domain 415(1-4) where data that is to be transmitted resides, cache line boundary offset, number of pages of data to be transmitted, the byte offset into the cache line. The message field 479 of the transmit queue 460(1-4) may also contain destination information such as the page frame numbers of the receive buffer 472(1-4) (FIG. 4A) of the destination client domain 415(1-4).

The SRD 410(1-2) maps (at 715) the page frame numbers of the transmit buffer 470(1-4) (FIG. 4A) of the source client domain 415(1-4) into the SRD 410(1-2) so that the mapped memory becomes shared memory. Similarly, The SRD 410 (1-2) maps (at 720) the page frame numbers of the receive buffer 472(1-4) of the destination client domain 415(1-4) into the SRD 410(1-2). The amount of memory that is mapped generally depends on the amount of the data that is to transferred, although in other embodiments, additional memory may be mapped as desired.

The SRD 410(1-2) copies (at 725) the data from the source mapped memory region (which corresponds to the transmit buffer 470(1-4) in the source client domain 415(1-4)) to the destination mapped memory region (which corresponds to the receive buffer 472(1-4) in the destination client domain 415(1-4)). In one embodiment, a bcopy command (an assembly-level routine) may be utilized to transfer the data between the two memory mapped regions.

If the bcopy command fails during a data transfer, then, in one embodiment, the resulting error is handled by the underlying hardware (e.g., the expander board 40 and its components) so that the error does not affect other domains in the domain set 409 (see FIG. 4A). The bcopy command may fail, for example, if the request agent 392 (see FIG. 3A), based on a bcopy command to transfer data, does not assert the underlying request as mapped. In such a case, the resulting trap is handled by the expander board 40, which, instead of causing a shutdown, transmits a preselected code to the software indicating that the bcopy has failed. In this manner, the errors that occur during data transfer may be somewhat isolated in the domain set 409 such that data transfer between other domains in the domain set 409 is not adversely affected substantially.

Once the SRD 410(1-2) copies (at 725) the data, the SRD 410(1-2) removes (at 727) the memory regions that were mapped (at 715 and 720). As such, in one embodiment, the memory regions are dynamically mapped into the SRD 410(1-2) before each data transfer between client domains 415(1-4) and are then unmapped after the data has been transferred.

The SRD 410(1-2) posts (at 730) a message in the receive queue 465(1-4) of the destination client domain 415(1-4). The message, in one embodiment, indicates to the destination client domain 415(1-4) that the data has been moved to its receive buffer 472(1-4). The destination client domain 415(1-4) may then, as explained in FIG. 8 in more detail, process the message posted (at 730) by the SRD 410(1-2) in the receive queue 465(1-4) of that destination client domain 415(1-4).

Figure 8:
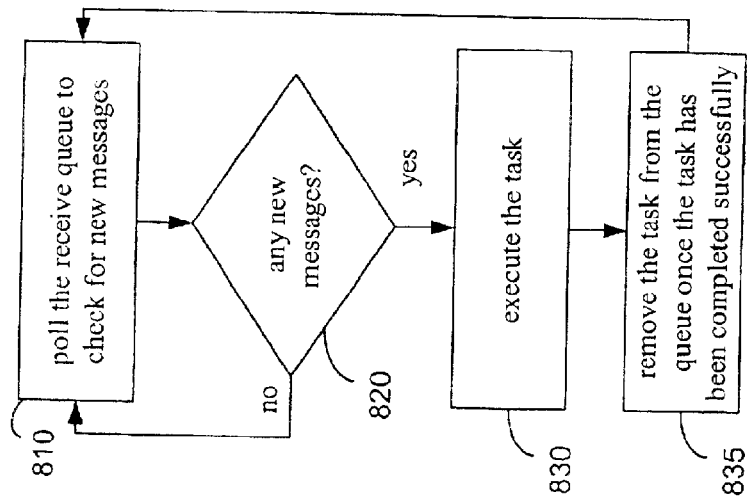
FIG. 8 illustrates a flow diagram of a method that may be implemented in a client domain of the domain set configuration of FIG. 4A.

Referring now to FIG. 8, a flow diagram of a method of processing messages in the receive queue 465(1-4) of the destination client domain 415(1-4) is illustrated, in accordance with one embodiment of the present invention. The destination client domain 415(1-4) polls (at 810) the receive queue 465(1-4) to check for new messages. The destination client domain 415(1-4) determines (at 820) if any new messages have been posted in the receive queue 465(1-4). If no new messages are detected, the destination client domain 415(1-4) may periodically poll (at 810) the receive queue 465(1-4) for new messages. If it is determined (at 820) that a new message has been posted in the receive queue 465 (1-4), then the destination client domain 415(1-4) executes (at 830) the task contained within that message. The task, in the illustrated example of FIG. 7, is to indicate to the destination client domain 415(1-4) that the data has been transferred to the receive buffer 472(1-4) from the transmit buffer 470(1-4) of the source client domain 415(1-4) and that the data in the receive buffer 472(1-4) may be moved to another location. Once the task has been completed, it may be removed (at 835) from the receive queue 465(1-4).

The above-described method illustrates transmission of data from the source client domain 415(1-4) to the destination client domain 415(1-4). Receiving (as opposed to transmitting) data from another client operates in a manner similar to that described above. For example, a requesting client domain 415(1-4) may post a message in its transmit queue 460(1-4) indicating that requesting client domain 415(1-4) desires selected data from the remote client domain 415(1-4). This message from the transmit queue 460(1-4) may be conveyed by the SRD 410(1-2) to the receive queue 465(1-4) of the remote client domain 415(1-4), which may then transmit data to the requesting client domain 415(1-4) in a manner similar to that described above in FIGS. 6-8.

The various system layers, routines, or modules may be executable control units, such as control unit 389 (see FIG. 3A). Each control unit 389 may include a microprocessor, a microcontroller, a digital signal processor, a processor card (including one or more microprocessors or controllers), or other control or computing devices.

The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method comprising:
   a first client device belonging to a first client domain, includes a first processor executing a first operating system;
   a second client device belonging to a second client domain, includes a second processor executing a second operating system; and
   a shared resource device belonging to a shared resource domain, includes a third processor executing software for managing communications between the first client device and the second client device by:
   receiving a request from the first client device of the first client domain to access the second client domain; and
   accessing the second client device of the second client domain in response to receiving the request from the first client device of the first client domain;
   isolating the first client domain, the second client domain and the shared resource domain from one another such that errors in a given domain do not affect the remaining domains.

2. The method of claim 1, wherein receiving the request further comprises receiving a request to access a resource of the second client domain.

3. The method of claim 2, wherein the resource is an interface, and wherein receiving the request further comprises receiving a request to access the interface of the second client domain to communicate with one or more external devices.

4. The method of claim 1, wherein receiving the request further comprises receiving the request to access data from a memory associated with the second client domain.

5. The method of claim 1, wherein using the shared resource domain to access the second client domain comprises accessing and copying data from the second client domain, transferring the data to the first client domain, and providing an indication to the first client domain in response to transferring the data.

6. The method of claim 5, wherein providing the indication comprises generating an interrupt in response to transferring the data.

7. The method of claim 6, further comprising detecting an error in a first shared resource domain.

8. The method of claim 7, further comprising allowing the first client domain to access second client domain through a second shared resource domain in response to detecting the error in the first shared resource domain.

9. The method of claim 1, further comprising using a second shared resource domain to manage at least a portion of the access between the first client domain and the second client domain.

10. A system comprising:
a first client device belonging to a first client domain, includes a first processor configured to execute a first operating system;
a second client device belonging to a second client domain, includes a second processor configured to execute a second operating system; and
a shared resource device belonging to a shared resource domain, includes a third processor configured to execute software for managing communications between the first client device and the second client device;
wherein the shared resource device is configured to:
receive a request from the first client device of the first client domain for data that is storable in a resource associated with the second client device belonging to the second client domain;
access the data from the resource associated with the second client device belonging to the second client domain;
transfer the data to the first client device of the first client domain; and
provide an indication to the first client device of the first client domain in response to transferring the data;
wherein the first client domain, the second client domain and the shared resource domain are isolated from one another such that errors in a given domain do not affect the remaining domains.

11. The system of claim 10, wherein the resource associated with the second client device comprises a memory associated with the second client device.

12. The system of claim 11, wherein the shared resource device includes a control unit configured to read the data from the memory of the second client device and copies the data into a memory associated with the first domain.

13. The system of claim 12, wherein the control unit is adapted to determine if at least one of the first domain and second domain is not responding.

14. The system of claim 13, wherein the control unit is adapted to provide an error indication in response to determining that at least one of the first domain and second domain is not responding.

15. The system of claim 10, further comprising a second shared resource device belong to a second shared resource domain configured to allow communication between the first and second domain in response to determining the first control unit is not responding.

16. The system of claim 12, wherein the shared resource device includes an interface, and wherein the control unit allows the first client device to access the interface to communicate with one or more external devices.

17. The system of claim 16, wherein the interface is adapted to receive Internet Protocol data packets.

18. The system of claim 17, wherein the interface is adapted to receive at least one of a transmission control packet protocol and a user datagram protocol.

19. An article comprising one or more machine-readable storage media containing instructions that when executed enable a processor to:
provide a request from a first client device belonging to a first client domain to a shared resource device belonging to a shared resource domain to access one or more resources belonging to a second client domain;
access the one or more resources in the second client domain in response to receiving the request; and
provide an indication to the first client domain in response to accessing the one or more resources in the second client domains;
isolate the first client domain, the second client domain and the shared resource domain from one another such that errors in a given domain do not affect the remaining domains.

20. The article of claim 19, wherein the instructions when executed enable the processor to request data that is stored in a memory associated with a second client device belonging to the second client domain.

21. The article of claim 20, wherein the instructions when executed enable the processor to copy the requested data from the memory of the second client device transfer the copied data from the memory of the second client device to the first client domain.

22. The article of claim 19, wherein the instructions when executed enable the processor to provide the request using the Internet Protocol.

23. The article of claim 19, wherein the instructions when executed enable the processor to detect an error in the shared resource domain.

24. The article of claim 23, wherein the instructions when executed enable the processor to switch to a second shared resource domain in response to detecting the error in the shared resource domain.

* * * * *

UNITED STATES PATENT AND TRADEMARK OFFICE
CERTIFICATE OF CORRECTION

PATENT NO. : 7,020,753 B2 Page 1 of 1
APPLICATION NO. : 10/042960
DATED : March 28, 2006
INVENTOR(S) : Shanahan et al.

It is certified that error appears in the above-identified patent and that said Letters Patent is hereby corrected as shown below:

On the title page:
IN THE TITLE COLUMN 1, LINE 1:

please delete title "INTER-DOMAIN DATA TRANSFER" and substitute title
--SHARED RESOURCE DOMAINS.--

Signed and Sealed this

First Day of April, 2008

JON W. DUDAS
*Director of the United States Patent and Trademark Office*